Figure 1:
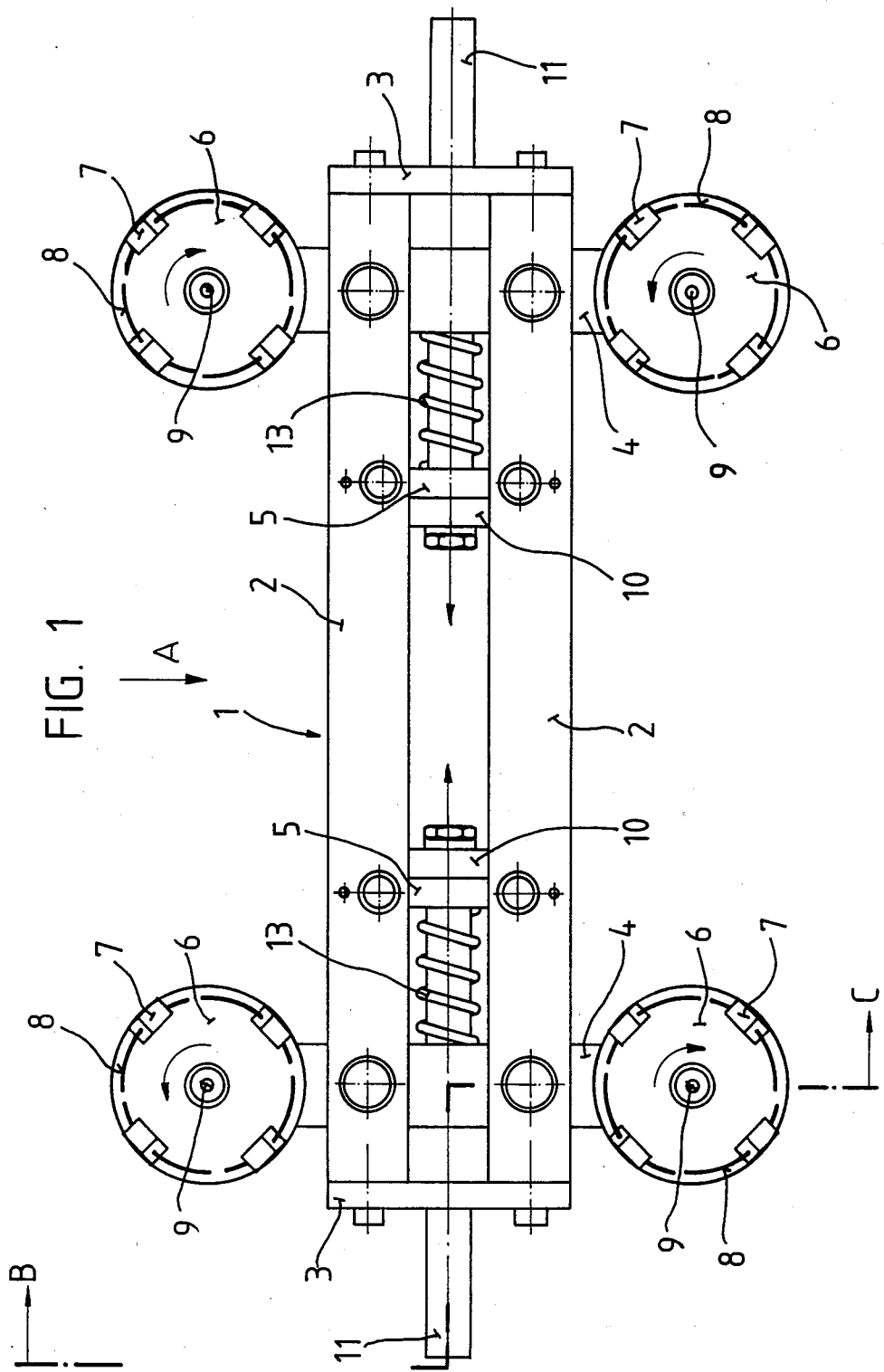

United States Patent [19]

Gehrig

[11] Patent Number: 4,761,027
[45] Date of Patent: Aug. 2, 1988

[54] DEVICE FOR PICKING UP FLEXIBLE AND/OR POROUS AND/OR STICKY FLAT ARTICLES OR SHAPES

[75] Inventor: Heinz Gehrig, Kaiserslautern, Fed. Rep. of Germany

[73] Assignee: Hoesch Maschinenfabrik Deutschland AG, Dortmund, Fed. Rep. of Germany

[21] Appl. No.: 33,508

[22] Filed: Apr. 1, 1987

[30] Foreign Application Priority Data

Apr. 3, 1986 [DE] Fed. Rep. of Germany ....... 3611101

[51] Int. Cl.⁴ .............................................. B65H 3/22
[52] U.S. Cl. ..................................... 294/61; 271/18.3; 414/117
[58] Field of Search ........................ 294/61, 50.5, 50.6, 294/50.7, 50.8, 120, 121, 126; 271/18.3, 18, 19; 414/412, 117, 730

[56] References Cited

U.S. PATENT DOCUMENTS

| 3,176,979 | 4/1965 | Engelmann | 294/61 |
| 4,165,811 | 8/1979 | Mainvielle | 294/61 |
| 4,641,826 | 2/1987 | van der Weide | 294/61 |

Primary Examiner—James B. Marbert
Attorney, Agent, or Firm—Max Fogiel

[57] ABSTRACT

The device for picking up flat articles or shapes has a gripping mechanism secured to the end of a moving arm, which is for example part of a robot. The gripping mechanism consists of at least two grippers that face each other in a plane on a frame and have gripper pins mounted on them. To allow gripping procedures to be carried out automatically the grippers are mounted in such a way that they can rotate, so that, during an appropriate rotation, the pins, which are in the shape of the arc of a circle and oriented in the form of a multiple screw thread, will be inserted into and extracted from the flat articles or shapes.

5 Claims, 3 Drawing Sheets

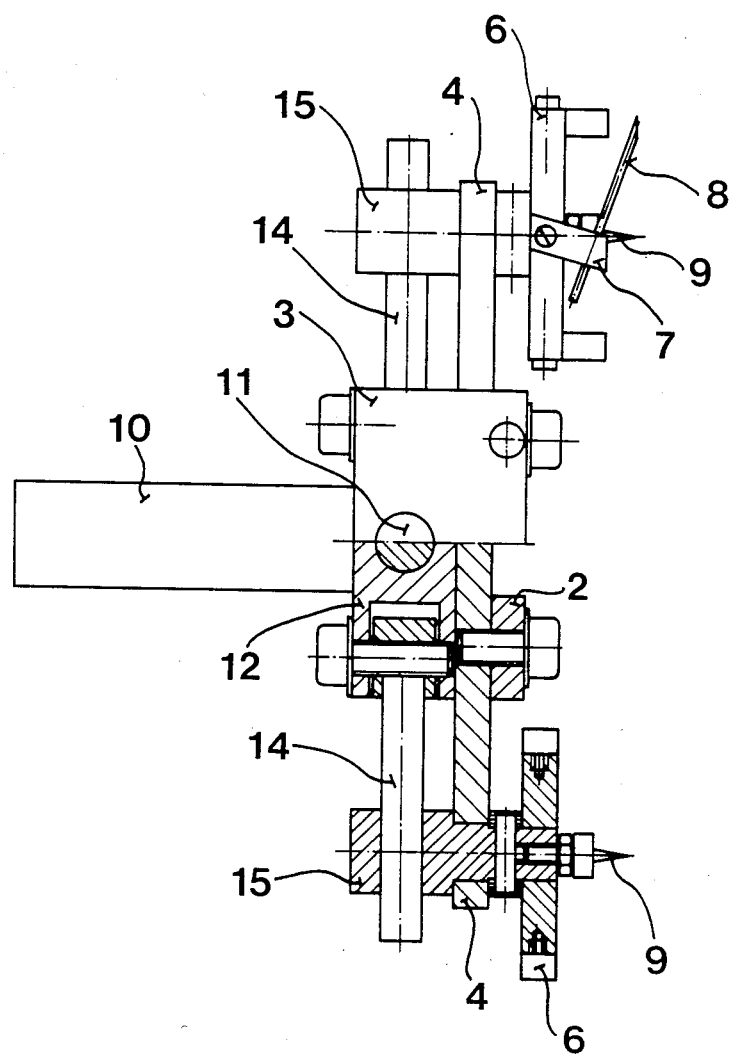

DEVICE FOR PICKING UP FLEXIBLE AND/OR POROUS AND/OR STICKY FLAT ARTICLES OR SHAPES

The invention concerns a device as recited in the preamble to claim 1.

Devices for picking up discrete material of all types and then positioning the materials are known. Included are those wherein grippers equipped with pins grab flexible flat articles from a support, lift, shift, and position them, and release them again. The grippers are secured in conveyor frames and move along with them. The pins are straight and oriented at an angle to the flat articles being picked up, which are accordingly pierced in a straight axial motion. The pins are also frequently interlaced, sloping alternately to the right and to the left, that is, to improve their grip on the flat articles while conveying them.

These devices, however, are not satisfactory in all respects, either because the flexible flat articles tend to wrinkle and the shapes to get displaced when picked up or laid down, because additional mechanisms are necessary to remove them from the pins, or because gripping effectiveness depends on the structure of the support that the materials are stacked on. Furthermore, use of these devices does not rule out employing expensive manual labor.

Robots are being employed more and more in manufacturing to take over jobs previously carried out by humans. The arms on such robots can carry out the widest variety of motions.

The object of the invention is to create a device that will, in conjunction with the arm of a robot, automatically pick up flat articles or shapes and wherein the grippers that directly affect the gripping procedure can also be adjusted to the widest range of material properties on the part of the flat articles or shapes.

This object is attained by the measures recited in the body of claim 1.

The device in accordance with the invention can be employed to very precisely pick up flat articles and shapes of the widest variety either from a stack or from a flat support. Very thin flexible flat articles like mats, woven and non-woven fabrics, and felts, as well as porous rigid and non-rigid expanded plastic pieces and still soft shapes or semifinished products of fiber-reinforced plastic—called sheet-molding compounds (SMC) or glass-mat reinforced thermoplastics (GMT)—can be picked up. Due to their special design and disposition on the grippers all the pins always penetrate simultaneously into the flat article or shape during a gripping procedure. The depth of penetration can be adjusted to the thickness of the pieces being picked up. This is accomplished by varying the extent of rotation of the grippers. The device is also distinguished by it extreme simplicity, which makes it extraordinarily insensitive to malfunction. Also to be emphasized is the device's small size. In the simplest case it is sufficient to mount two grippers on one carrier. There can, however, depending on the size of the flat article or shape, be four or more grippers. Each gripper has several—three to five—pins, and the pins are shaped like the arc of a circle and disposed in the form of a multiple screw thread, meaning that the pins constitute on the whole a circular ring (crown of pins) and always enclose an equal angle (thread pitch) in conjunction with the surface of the gripper. Thick materials can also be picked up and stacked with no problem.

In accordance with a further characteristic of the invention a centering pin is positioned on each gripper in the axis of rotation of the pins. This increases the positioning reliability when the gripping mechanism is applied to a flat article or shape. The flat article or shape is drawn more or less deeply into the centering pin as the gripper rotates.

The device can in a practical way be designed as recited in claims 3 through 5. The embodiment recited in claims 3 and 4 in particular ensures very rapid pickup and deposit of the flat article or shape. The grippers can be rotated mechanically, hydraulically, pneumatically, or electrically, and they can be driven independently or collectively. Conventional mechanical components like rods, arms, cogwheels, and toothed belts are appropriate for transmitting the forces. The rotation can be controlled with stops or angle-of-rotation sensors, numerical step generators for example. Opposite grippers are preferably capable of being rotated in opposing directions. This makes it possible to compensate for centrifugal forces and moments. It also prevents the flat articles or shapes from being displaced when the pins penetrate and are extracted from them.

Figure 2:
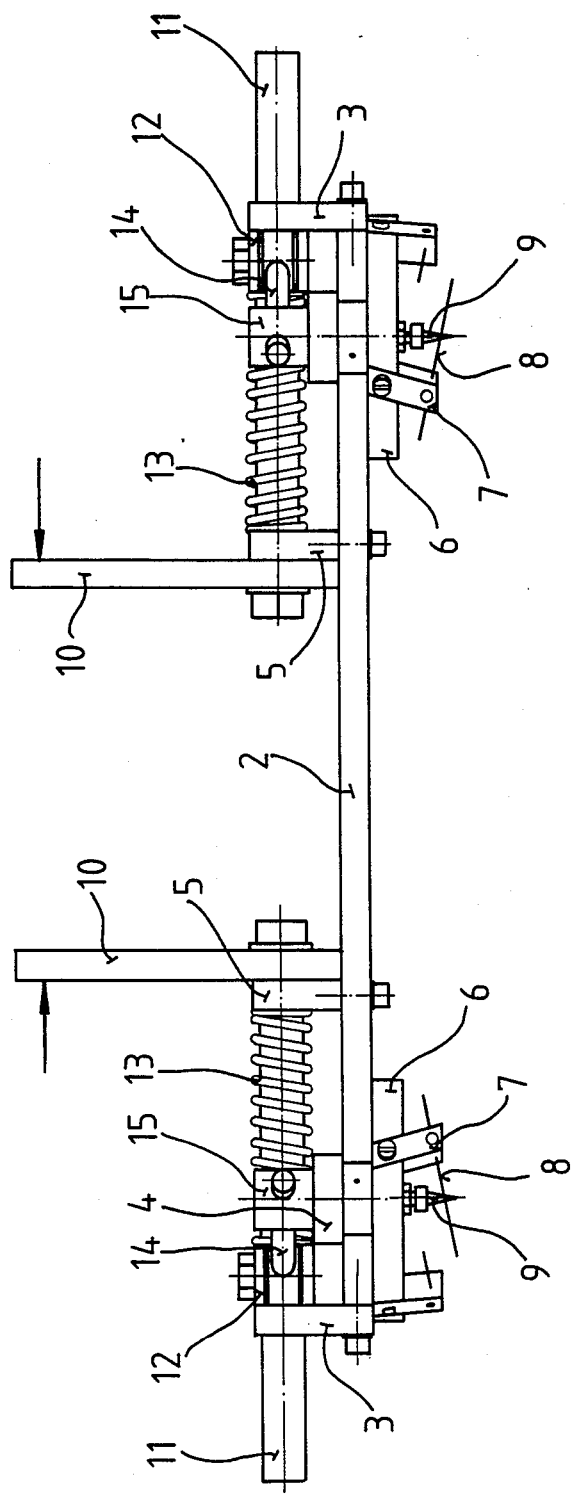

One embodiment of the invention will now be specified with reference to the drawings, wherein FIG. 1 is a schematic bottom view of a gripping mechanism, FIG. 2 is a side view of the same mechanism along the direction indicated by the arrow A in FIG. 1, and FIG. 3 is a view of the mechanism in partial section along the line B-C in FIG. 1.

The gripping mechanism consists essentially of a frame 1 made out of lengths 2, 3, 4, and 5 of structural section and of four grippers 6 arranged in facing pairs in the same plane on lengths 4. Grippers 6 are in the form of disks, and mounted on each are four gripper pins 8 secured in holders 7. Each pin is shaped like the arc of a circle, and they are disposed in the form of a multiple screw thread, meaning that the pins in each gripper are mounted at least approximately along a circular curve and at an angle to the surface of the gripper. The result is what is called a crown of pins in association with each gripper. A centering pin is mounted at the center of the axis of rotation of the pins or crown of pins.

Frame 1 is secured to the end of a moving arm that is part of a conventional robot. Tongs that can be activated by a hydraulic or pneumatic piston-and-cylinder mechanism are provided on the arm, with their jaws acting on lengths 10 of structural section in the gripping mechanism. The robot and its arm and tongs are not illustrated in the drawings.

With the gripping mechanism in the starting position, lengths 10 of structural section rest against frame lengths 5, which act as stops. Each length 10 is for this purpose secured to a pusher rod 11 that extends through lengths 3 and 5 and is attached to a bifurcated head 12. A helical spring 13 is mounted on each pusher rod 11 between bifurcated head 12, which is rigidly fastened to the rod, and length 5. Spring 13 is subjected to tension when the tongs on the robot arm close. The motion and force are transmitted between bifurcated head 12 and grippers 6 by arms 14, which are articulated to and pivot in the heads. Each free end of a pivoting arm 14 is connected to a shaft 15. A gripper 6 is mounted on each shaft. Pivoting arms 14 can slide back and forth in shafts 15 to compensate for relative motion during the gripping procedure.

To pick up flat articles or shapes the robot arm positions the gripper device over them, with the penetrating centering pins 9 securing the piece in position. The tongs displace lengths 10 against the force of the springs 13 compressed between lengths 5 and bifurcated heads 12. The heads move simultaneously, and their translational motion is converted by the pivoting and sliding arms 14 into a rotation on the part of grippers 6. Pins 8 accordingly penetrate into the flat article or shape. The direction that the grippers or pins rotate in is indicated. To terminate the gripping procedure, to deposit the flat articles or shapes that is, the tongs open, allowing springs 13 to return lengths 10 to their starting position, and pins 8 release the flat article or shape as the result of the accordingly initiated contrary rotation of grippers 6. No extra mechanisms, such as strippers for removing them from the pins, are necessary when depositing the flat articles or shapes, even when they have sticky surfaces or have uneven surfaces. It is also unnecessary to provide specially designed supports for picking up the parts that are to be gripped.

I claim:

1. A device for picking up flexible and/or porous and/or sticky flat articles or shapes with gripping means secured to the end of a movable robot arm, comprising: at least two grippers facing each other in a plane on a frame; gripper pins mounted on said two grippers; said pins mounted on said grippers being in shape of an arc of a circle; pins associated with one gripper being oriented in form of a multiple screw thread; said grippers being rotatable about a vertical axis so that said gripper pins are insertable into and extractable from flat articles along a helical path; a centering pin positioned on each gripper in an axis of rotation of said gripper pins; opposing grippers being rotatable in opposite directions; single-layer material as well as stacks of material with a plurality of layers being grippable and transportable for one and the same gripper pin setting.

2. A device as claimed in claim 1, including a pusher rod; a bifurcated head attached to said pusher rod; and two pivoting arms pivoting in said bifurcated head for forming a lever arrangement to rotate two grippers.

3. A device as defined in claim 2, including stops for limiting rotatable motion of two grippers.

4. A device as defined in claim 2, including an angular position sensor for limiting rotational motion of two grippers.

5. A gripping device comprising: a frame with structural longitudinal members; four grippers arranged in facing pairs in an identical plane on said structural members; said grippers comprising disks; four gripper pins mounted on each disk and secured in holders; each pin being shaped in an arc of a circle and being in form of a multiple screw thread so that pins in each gripper are mounted at least substantially along a circular curve and at an angle to a gripper surface; a centering pin mounted at a center of rotation of said pins; a plurality of said structural members comprising stops; a pusher rod attached to each structural member comprising said stops; a bifurcated head connected to said pusher rod; a helical spring mounted on each pusher rod; pivoting arms pivoting in said head, motion and force being transmitted between said bifurcated head and said grippers by said pivoting arms; a shaft connected to each free end of a pivoting arm; said pivoting arms being slidable back and forth in said shafts to compensate for relative motion during a gripping procedure.

* * * * *